(12) United States Patent
White et al.

(10) Patent No.: US 6,854,239 B2
(45) Date of Patent: Feb. 15, 2005

(54) UNITIZED CORNER BRACE

(76) Inventors: Douglas E. White, RR # 3, Ingersoll, Ontario (CA), N5C 3J6; Anthony M. Plateeuw, RR # 3, Delhi, Ontario (CA), N4B 2W6

(*) Notice: Subject to any disclaimer, the term of this patent is extended or adjusted under 35 U.S.C. 154(b) by 49 days.

(21) Appl. No.: 10/310,909

(22) Filed: Dec. 6, 2002

(65) Prior Publication Data

US 2004/0107667 A1 Jun. 10, 2004

(51) Int. Cl.⁷ ............................................. E04H 1/00
(52) U.S. Cl. ..................... 52/657; 248/300; 248/220.1; 16/29
(58) Field of Search .................. 248/300, 903, 248/220.1, 346.02; 403/231; 52/657, 287.1; 108/91, 53.3, 53.1; 211/49.1, 59.4, 126.7; 16/29; 72/186, 129, 130, 324

(56) References Cited

U.S. PATENT DOCUMENTS

| | | | | |
|---|---|---|---|---|
| 738,847 A | * | 9/1903 | Rummel | 248/220.1 |
| 1,593,329 A | * | 7/1926 | Debus | 217/69 |
| 2,579,685 A | * | 12/1951 | Loose | 108/53.5 |
| 2,860,805 A | * | 11/1958 | Katterjohn | 217/69 |
| 3,639,942 A | * | 2/1972 | Ostrom | 16/29 |
| 3,651,610 A | * | 3/1972 | Donahue | 52/278 |
| 4,065,818 A | * | 1/1978 | Farina | 5/288 |
| 4,187,578 A | * | 2/1980 | Little | 16/29 |
| 4,295,482 A | * | 10/1981 | McMullen | 135/90 |
| 4,773,547 A | * | 9/1988 | Bell | 211/194 |
| 4,837,997 A | * | 6/1989 | Zeilinger | 52/280 |
| 5,312,078 A | * | 5/1994 | Marsh | 248/220.1 |
| 5,399,044 A | * | 3/1995 | Gilb | 403/231 |
| 5,431,336 A | * | 7/1995 | Clee | 229/199 |
| 5,884,435 A | * | 3/1999 | David et al. | 52/62 |
| 6,022,165 A | * | 2/2000 | Lin | 403/231 |
| 6,144,552 A | * | 11/2000 | Whitcher et al. | 361/681 |
| 6,178,601 B1 | * | 1/2001 | Craig, Jr. | 24/20 R |
| 6,324,724 B1 | * | 12/2001 | Reilly, Jr. | 16/29 |
| 6,325,349 B1 | * | 12/2001 | Breaux | 248/263 |
| 6,564,607 B2 | * | 5/2003 | Nozaki et al. | 72/185 |
| 6,701,548 B2 | * | 3/2004 | Vigneron | 5/110 |

FOREIGN PATENT DOCUMENTS

GB 2273281 A * 6/1994 ............ B65D/19/44

* cited by examiner

Primary Examiner—Ramon O. Ramirez
Assistant Examiner—Ingrid Weinhold
(74) Attorney, Agent, or Firm—Anissimoff & Associates; Robert A. H. Brunet

(57) ABSTRACT

A unitized corner brace for attachment to the corner of a structure. The unitized corner brace comprises a central portion having an edge and a right angle; two spaced apart tabs extending from the edge, each tab having a stepped portion proximal to the edge and stepped towards each other, the right angle being between the spaced apart tabs such that the tabs are perpendicular to each other; and, opposed bracket portions extending from the central portion. A method of manufacturing a unitized corner brace from a single piece of material and a stackable structure made using a unitized corner brace are also disclosed.

20 Claims, 7 Drawing Sheets

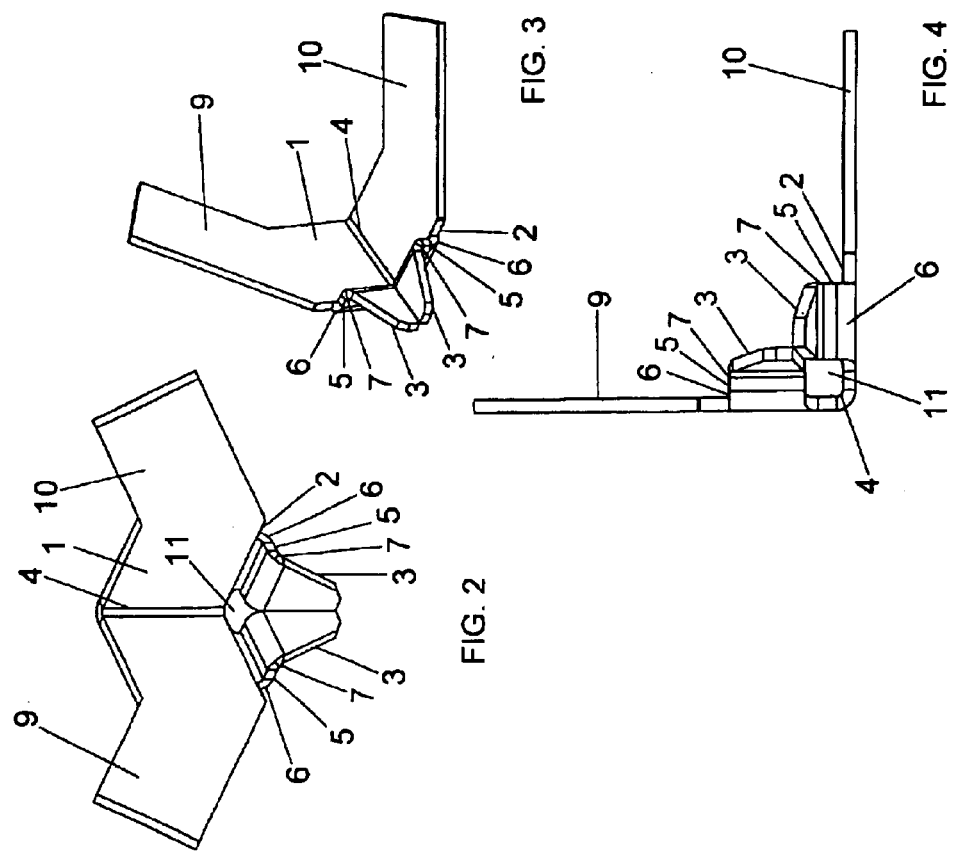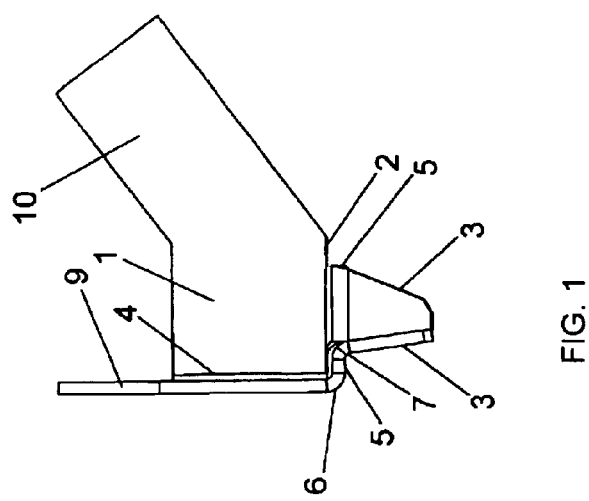

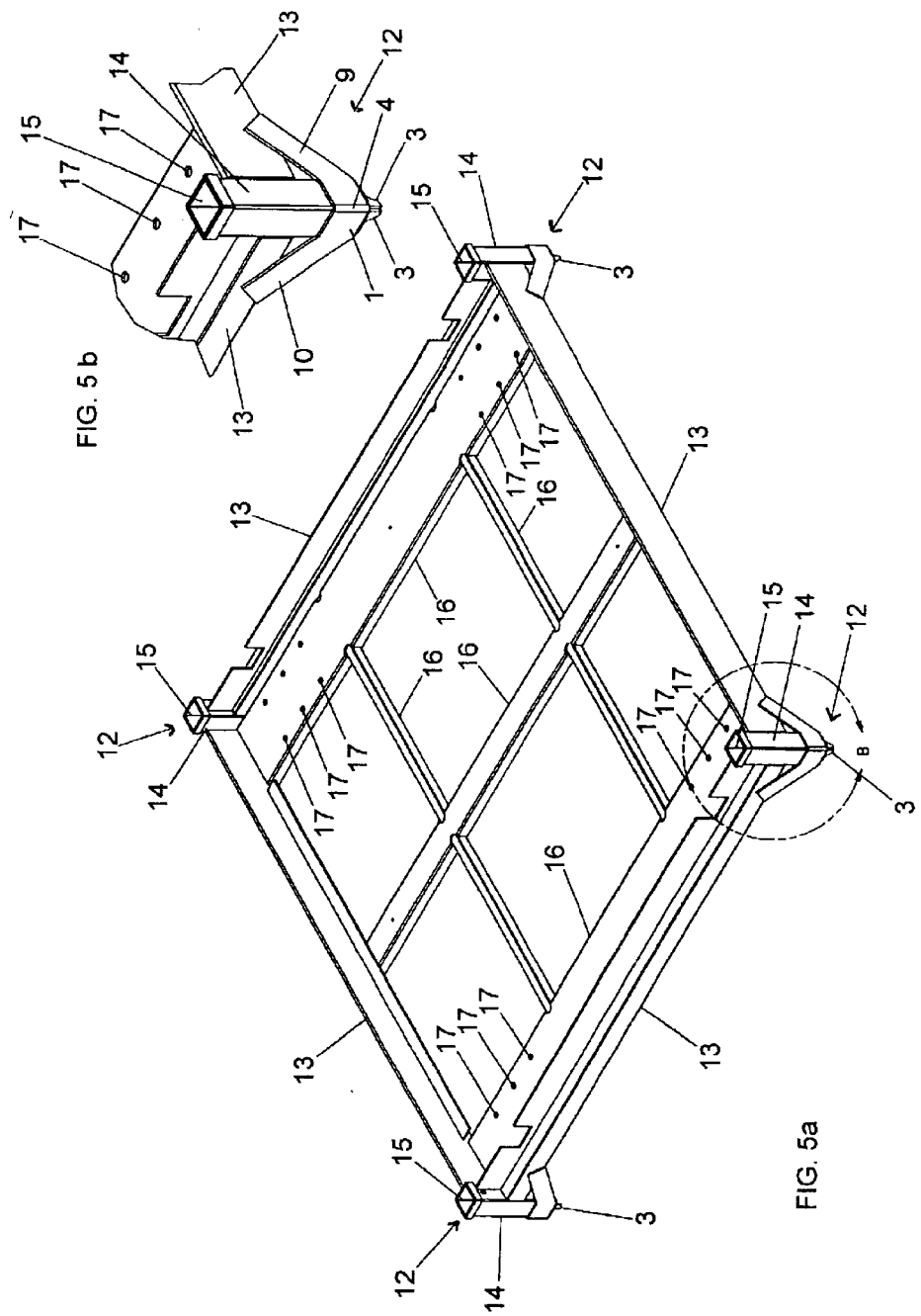

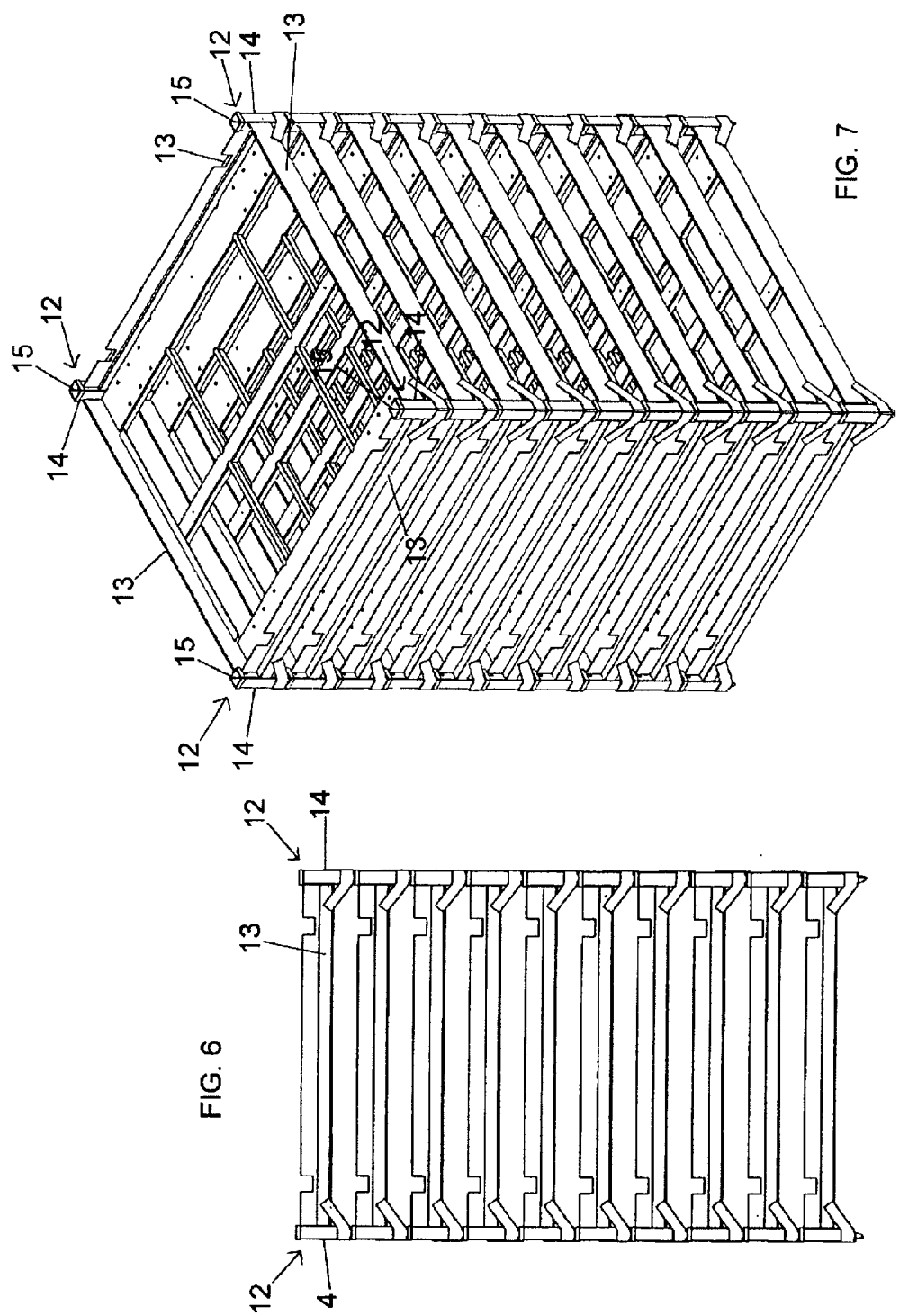

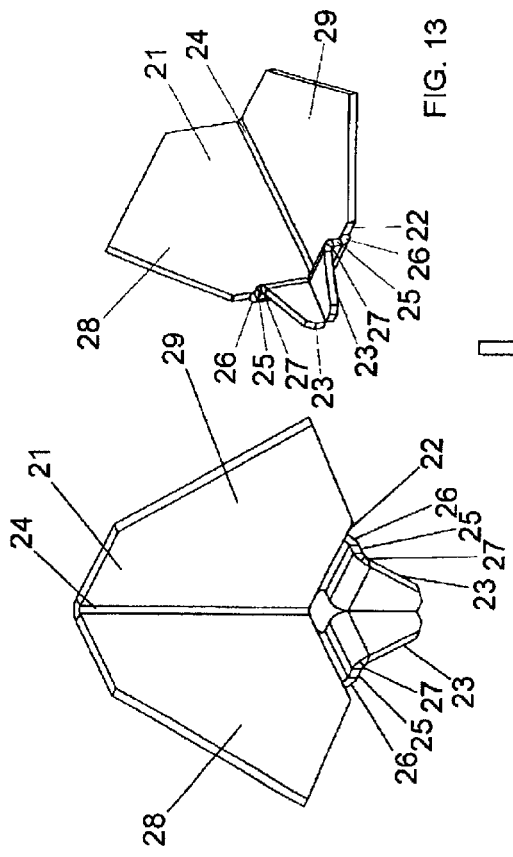
FIG. 13
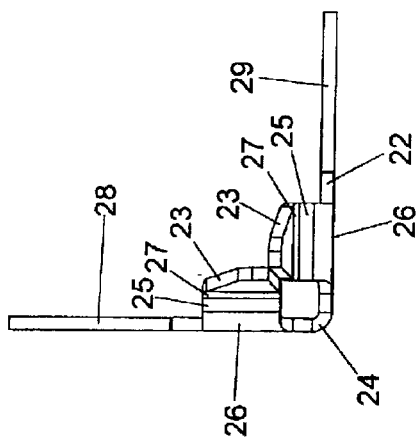
FIG. 14
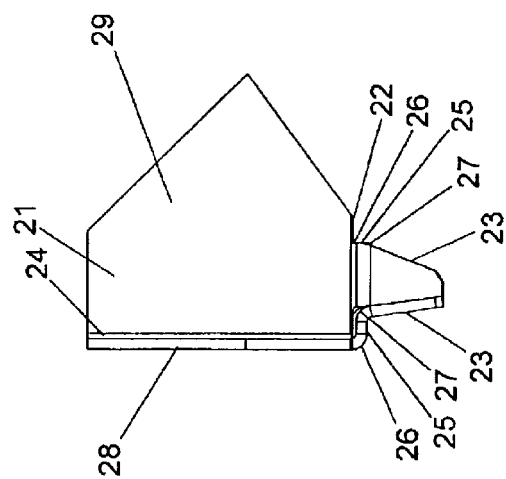
FIG. 12
FIG. 11

UNITIZED CORNER BRACE

FIELD OF THE INVENTION

A unitized corner brace for use in assembling a structure. More particularly, a unitized corner brace for use in assembling a stackable structure that may be stacked with other such structures, for example, when storing or transporting a plurality of the stackable structures.

BACKGROUND OF THE INVENTION

Structural members may be arranged perpendicular to one another and attached to form the corners of a structure. To strengthen the structure, the corners may be reinforced using a brace having a right angle that is installed on the outside of the corner and attached to each structural member.

A structure may be used, for example, to form the base of a cart, shelf, or storage bin. To use the structure in this manner, a post support member may be installed at each corner perpendicular to the structural members. The post support member has an open end for receiving a removable post that may be used, for example, to support a removable shelf. The opposite end of the post support member is typically squeezed from all sides, thereby creating a tapered end with a reduced cross-sectional area; this process is called "swedging". To reduce the amount of space occupied by the cart, shelf, or storage bin when empty, the posts may be removed and the bases vertically stacked upon one another by inserting the tapered end of each post support member within the open end of the corresponding post support member of the adjacent base. This allows a stack of structures to be created.

However, the manufacture of these types of structures requires a number of parts to be manufactured and then attached to form the corner, typically by welding the parts together. This is a time and labour intensive process, which makes the cart expensive. Also, the concentration of heat at the corner can cause warping and twisting of the structure, making the structures difficult to stack. The application of heat also embrittles the structure, making the corners weak and susceptible to breakage. When a load is applied to the posts they can become wedged within the tapered end of the post support member, making them difficult to remove; also, the posts can cause the tapered ends to spread, allowing the posts to be inserted to a non-uniform depth. Structures made in this manner often have jagged or sharp corners that can pose a safety hazard for people working with the structure. The tapered corners formed by swedging are typically not uniform and are not consistently inserted within the post support members, creating some instability in the stack of structures. Furthermore, unwanted material, such as dirt or water, can accumulate within the swedged post support member. For corrosion resistance, the structure is typically dipped in a hot bath of galvanizing material and the galvanizing material can similarly accumulate in the post support member, making it difficult to insert the post.

The need therefore exists for an improved corner brace to simplify the manufacturing process and to create an improved stackable structure.

SUMMARY OF THE INVENTION

According to an aspect of the invention, there is provided a unitized corner brace comprising: a central portion having an edge and a right angle; two spaced apart tabs extending from the edge, each tab having a stepped portion proximal to the edge and stepped towards each other, the right angle being between the spaced apart tabs such that the tabs are perpendicular to each other; and, opposed bracket portions extending from the central portion.

According to another aspect of the invention, there is provided a stackable structure having four corners, each corner comprising: a pair of perpendicular structural members; a post support member perpendicular to the structural members, the post support member having a length and comprising two ends, a right angle along the length of the post support member, and an open portion adjacent at least one of the ends; a unitized corner brace comprising: a central portion having an edge and a right angle; two spaced apart tabs extending from the edge, each tab having a stepped portion proximal to the edges and stepped towards each other, the right angle being between the spaced apart tabs such that the tabs are perpendicular to each other; and, bracket portions extending from the central portion to form opposed brackets; and, wherein the central portion is adjacent the post support member, the right angle of the central portion and the right angle of the post support member are aligned, the stepped portion abuts an end of the post support member distal from the open portion, the central portion is attached to the post support member, the perpendicular structural members are adjacent the bracket portions and attached thereto and wherein each corner is aligned with the adjacent corners and connected thereto by means of a perpendicular structural member.

According to yet another aspect of the invention, there is provided a method of manufacturing a unitized corner brace comprising: cutting a single piece of material into a flat blank having a central portion having an edge comprising two spaced apart tabs extending from the edge, the central portion having opposed bracket portions extending therefrom; forming a right angle in the central portion between the two spaced apart tabs; and, forming a stepped portion in each tab proximal to the edge and stepped towards each other.

According to yet another aspect of the invention, there is provided a method for stacking a plurality of stackable structures having corners, each corner having a post support member having a length and comprising two ends, a right angle along the length of the post support member, and an open portion adjacent at least one of the ends, each corner further having a unitized corner brace having tabs, the tabs having stepped portions for engagement with the end of a post support member, the unitized corner brace attached to the post support member adjacent one end of the post support member, the method comprising: vertically orienting the post members of the plurality of stackable structures, each stackable structure having a similar vertical orientation; vertically aligning the corners of each stackable structure; fitting the tab portions of a stackable structure within the open portions of an adjacent stackable structure; and, engaging the stepped portions of a stackable structure with the end of the post support members of the adjacent stackable structure.

The unitized corner brace according to the present invention is preferably made from a single piece of material. The tabs may have any suitable shape, for example quadrilateral or triangular. There may be a plurality of tabs and the tabs need not be identical. The tabs are stepped towards each other and may be angled between 45° and 90° with respect to the central portion. The stepped portion may extend any suitable distance from the central portion, but preferably extends 2–5 times the material thickness of the post support member. The remainder of the tab extending from the stepped portion may be parallel with the central portion or may be angled inwardly towards the corresponding tab. The tabs may be attached to one another, for example by means of welding, to minimize misalignment of the tabs during use. A space may be formed between the tabs and the edge of the central portion; this space permits the passage of unwanted material from the post support member, such as dirt, water, galvanizing material, or other forms of debris. When the tabs are attached to one another, the space may be bounded by the stepped portion and the edge of the central portion. The bracket portions may be any suitable shape, for example, substantially quadrilateral in shape or substantially triangular in shape and have a length suitable to permit attachment to the structural members.

The post support member may be of any suitable cross-sectional shape, for example an L-shape, C-shape, or square shape. The post support member need not necessarily be made of a continuous piece and may change cross-sectional shape along its length. The open portion of the post support member is sized to at least accommodate the tabs and the open portion may be continuous along the length of the post support member. The post support member may be a tube with a hollow interior and the open portion is the hollow interior of the tube. The central portion generally corresponds in size with the post support member so that the brace may be installed over the outside of the post support member with the bracket portions extending from the central portion to overlap with the perpendicular structural members. The perpendicular structural members may be attached to each other, the post support member, the unitized corner brace, or a combination thereof. The perpendicular structural members may be continuous between adjacent corners or may be comprised of several attached members. The perpendicular structural members need not be of continuous cross-sectional shape and may have, for example, an L-shape, C-shape, rectangular shape, or square shape.

In a preferred method of manufacturing the unitized corner brace, a single piece of material is cut into a flat blank by any suitable means, for example by stamping, shearing, water jet, focused radiation discharge, such as laser, plasma, or electricity, or a combination thereof. The right angle may be formed by bending the flat blank and the stepped portions may be formed by bending the tabs. The bending may be accomplished using a progressive die or set of dies having a shape corresponding to the unitized corner brace or a portion thereof. The brace may be formed in the shape of the die by successively applying pressure to the blank using a break press capable of applying sufficient pressure to bend the blank. Alternative shape forming techniques may be used to form the unitized corner brace, for example hydro forming or conventional break forming.

Structures according to the present invention may be used in a variety of applications. For example, the structure may be used to form the base of a cart, a shelf, or a storage bin. One advantage of using a structure according to the present invention in these applications is that the post members may be removed from the post support members and the structure may then be vertically stacked upon other similar structures.

This is advantageous, for example, when it is desirable to reduce the amount of space occupied by the cart, shelf, or bin when not in use. For example, when a cart is used to transport plant materials, it is advantageous to disassemble the empty cart and stack the cart bases to reduce the amount of space occupied by the empty cart. This is especially advantageous when the assembled carts are loaded on to a transport vehicle, such as a truck, for transport of the carts and plant materials to a certain location and the empty carts are stacked for return shipment, thereby minimizing shipping costs and allowing additional items to be returned with the carts.

BRIEF DESCRIPTION OF THE DRAWINGS

Having regard to the foregoing and in order to more thoroughly understand the invention, non-limiting embodiments of the invention will be described with reference to the accompanying drawings, in which:

FIG. 1 shows a side view of a unitized corner brace according to an embodiment of the present invention;

FIG. 2 shows a perspective view of a unitized corner brace according to an embodiment of the present invention;

FIG. 3 shows an alternative perspective view of a unitized corner brace according to an embodiment of the present invention;

FIG. 4 shows an end view of a unitized corner brace according to an embodiment of the present invention;

FIG. 5*a* shows a perspective view of a structure according to an embodiment of the present invention;

FIG. 5*b* shows an enlarged perspective view of a corner of a structure according to an embodiment of the present invention;

FIG. 6 shows a side view of a plurality of stacked structures according to an embodiment of the present invention;

FIG. 7 shows a perspective view of a plurality of stacked structures according to an embodiment of the present invention;

FIG. 11 shows a side view of a unitized corner brace according to an alternate embodiment of the present invention;

FIG. 12 shows a perspective view of a unitized corner brace according to an alternate embodiment of the present invention;

FIG. 13 shows an alternative perspective view of a unitized corner brace according to an alternate embodiment of the present invention;

FIG. 14 shows an end view of a unitized corner brace according to an embodiment of the present invention; and, FIG. 15 shows a side view of a flat blank according to an alternate embodiment of the present invention;

DETAILED DESCRIPTION

Figure 9:
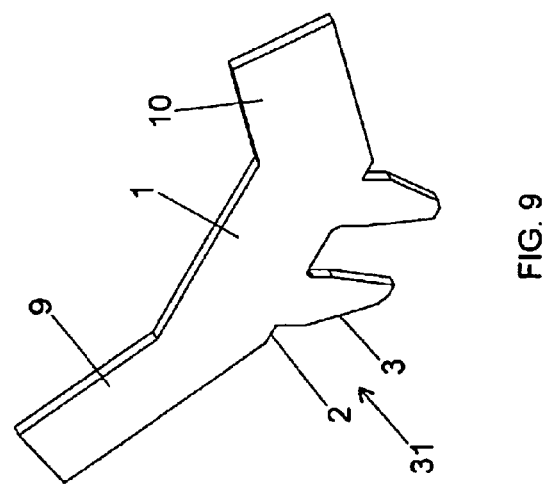
FIG. 9 shows a perspective view of a flat blank according to an embodiment of the present invention.

In the following description, like features in the figures will be referred to by like numerals to aid in understanding the embodiments of the invention. Referring to FIGS. 1–4, an embodiment of a unitized corner brace made from a single piece of material is shown. The unitized corner brace has a central portion 1, having an edge 2 with spaced apart tabs 3 and also having a right angle 4 located midway between the tabs. The unitized corner brace is generally symmetrical about the right angle 4. Each tab 3 has a stepped portion 5 proximal to the edge 2 that has two bends 6, 7. The bends 6, 7 are angled between 45° and 90° so that the tabs 3 are stepped towards each other. The bend 6 is angled about 90° with respect to the central portion 1, while the bend 7 is angled about 80° with respect to the stepped portion 5. The remainder of each tab 3 is angled inwardly with respect to the central portion 1 and is optionally attached to the other tab. Each tab 3 is also tapered towards the right angle 4 so that the tab is narrower at one end than the other. Extending from the central portion 1 are opposed bracket portions 9, 10. The bracket portions 9, 10 are substantially quadrilateral in shape and oriented upwardly from the central portion 1. Between the tabs 3 and the edge 2 is a space 11, the advantage of which will be more thoroughly described hereinafter.

FIG. 5a depicts a structure with four corners 12. The circle B indicates the corner shown in enlarged perspective view in FIG. 5b. With reference to FIGS. 5a and 5b, each corner comprises a pair of perpendicular structural members 13 and a post support member 14 that is perpendicular to the structural members. When assembled to form the structure according to the present invention, the structural members 13 are generally horizontal and the post support members 14 are generally vertical. The post support member 14 has a length, two ends, and an open portion. In the embodiment shown, the post support member has a square cross-section and has a hollow interior 15, the hollow interior being the open portion. The hollow interior 15 is along the entire length of the post support member 14. With reference additionally to FIGS. 1–4, the central portion 1 of the unitized corner brace is placed on the outside of the post support member 14 adjacent the lower end, with the right angle 4 aligned with a corner of the square cross-section. The stepped portion 5 abuts the lower end of the post support member 14 so that the tabs 3 partially obstruct the opening formed by the hollow interior 15. The space 11, not shown in FIG. 5a or 5b, allows unwanted material that may become trapped in the post support member 14 to flow out through the lower end of the post support member. This is especially advantageous if the structure is dipped in a hot bath of galvanizing material, as the space 11 prevents a build-up of the galvanizing material within the post support member 14 that could interfere with insertion of the posts as will be described hereinafter.

The central portion 1 is attached to the post support member 14, preferably by welding. The bracket portions 9, 10 overlap with the structural members 13 and are attached thereto, preferably by welding. Each of the structural members 13 is aligned with and connected to an adjacent corner of the structure. In the embodiment shown, the perpendicular structural members 13 are continuous along their length, although several attached pieces could be used to form any desired length. Additional cross pieces 16 may be attached to the structural members 13 to provide the necessary strength for a given application. In this embodiment, the cross pieces 16 include holes 17 for attachment of wheels to the underside thereof as will be described hereinafter. When attached to the corner, the unitized corner brace increases the strength and rigidity of the structure and reduces the likelihood of warping due to heat concentration at the corners.

Referring to FIGS. 6–7, and additionally referring to FIGS. 1–5b when needed, a plurality of the structures may be stacked. In the embodiment shown, the tabs 3, not shown in FIGS. 6–7, of each structure are oriented downwardly to facilitate stacking and the corners 12 are vertically aligned. The tabs 3 may then be fitted within the hollow interior 15 of the post support member 14 of an adjacent structure. The structure is then lowered until the stepped portions 5, not shown in FIGS. 6–7, engage the upper end of the post support member 14 of an adjacent structure. Preferably, the dimensions of the stepped portion are such that the tabs 3 fit snugly within the hollow interior 15 when the stepped portion 5 is engaged with the upper end of the post support member 14. The angle and taper of the tabs 3 aids in the alignment of the corners 12 during stacking. A stable stack of structures can thereby be formed that limits lateral movement of individual structures in the stack, especially during transportation of the stack.

Figure 8:
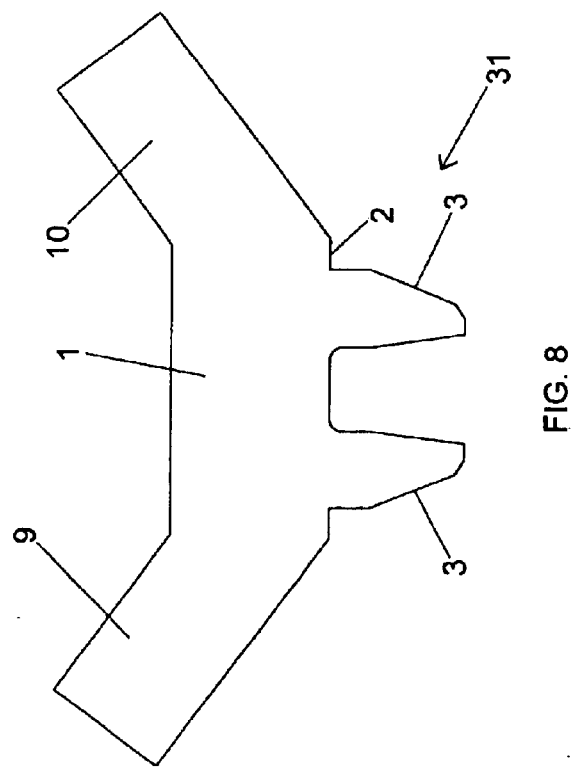
FIG. 8 shows a plan view of a flat blank according to an embodiment of the present invention.

To manufacture the unitized corner brace of FIGS. 1–4, a flat blank 31 is cut from a single piece of material having the shape shown in FIGS. 8 and 9. A right angle 4 is then formed in the central portion 1 between the spaced apart tabs 3, typically by bending the flat blank 31. A stepped portion 5 proximal to the edge 2 is then formed in each tab 3, typically by bending the tabs towards each other. In the embodiment shown, the tabs 3 are attached to each other, typically by means of welding, to prevent spreading of the tabs. The space 11 is then bounded by the stepped portion 5 of the tabs 3 and the edge 2.

The bends are typically made using a break press with a progressive die. The bends are typically made in stages to avoid work hardening and breakage of the material. The amount of bending accomplished in each stage may be pre-determined and the break press may be automatically programmed with the desired number of stages. The entire unitized corner brace may then be formed using a single progressive die. Alternatively, a number of dies may be used to form the right angle 4 and each of the bends 6, 7 in the tabs 3. A significant savings in time and labour can be achieved by making the unitized corner brace from a single piece of material as compared with welding a number of individual pieces.

Figure 10:
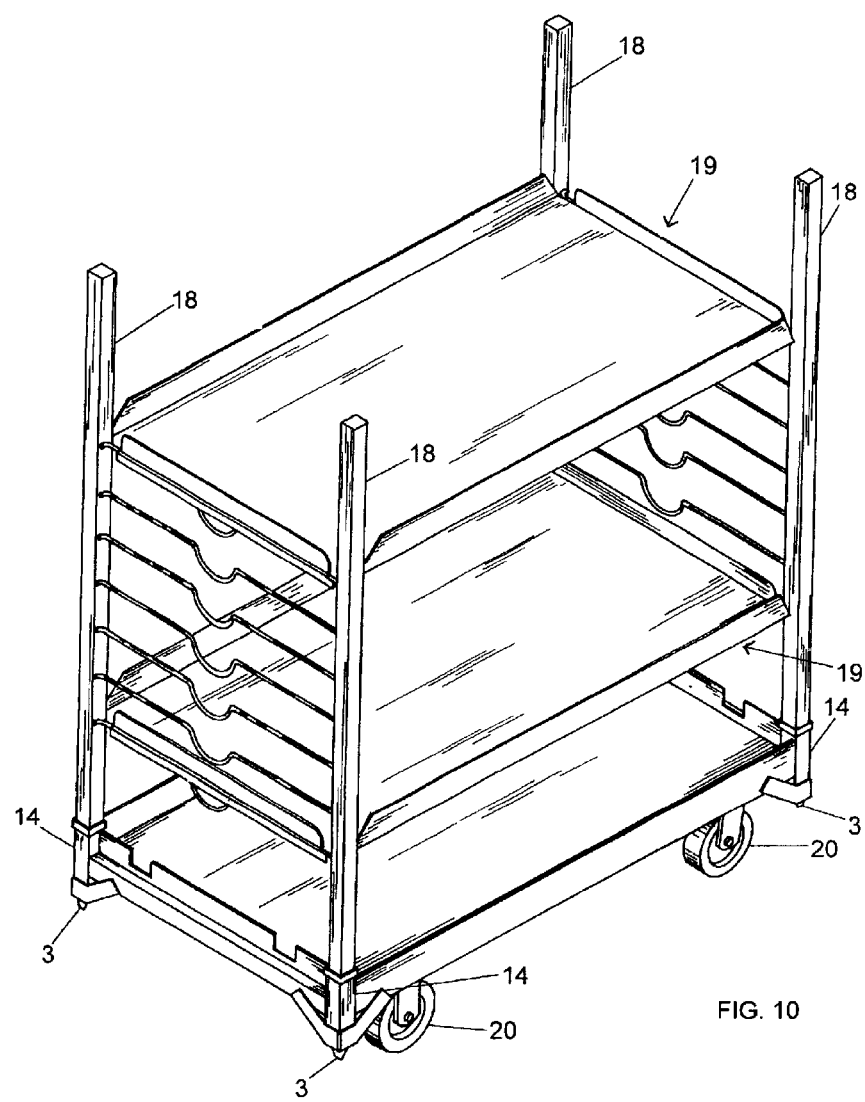
FIG. 10 shows a perspective view of a cart according to an alternate embodiment of the present invention.

Referring to FIG. 10 and additionally referring to FIG. 5a as needed, the structure of FIG. 5a is shown in use as a base for a cart. A post 18 is inserted within the hollow interior 15, not shown in FIG. 10, of each post support member 14. The post 18 is inserted until the lower end of the post engages the portion of the tab 3 obstructing the opening formed by the hollow interior 15 in the lower end of the post 14. Each post 18 is removable and may be secured within the post support member 14 by suitable means, such as by a removable pin (not shown). A removable shelf 19 may be suspended between the posts 18 and planar sheathing material (not shown) may be applied to the posts to create sides that enclose or partially enclose the cart as desired. Wheels 20 may be attached to the underside of cross members 16, not shown in FIG. 10, for moving the cart from place to place in a given location. A removable drawbar (not shown) may be optionally attached to the cart to facilitate movement of the cart. The cart may be used, for example, to transport plant material. When the cart is emptied, the shelves 19 and posts 18 may be removed and the bases stacked as previously described to minimize the space occupied by a plurality of bases. When stacked, the wheels 20 of one base do not interfere with the adjacent base and therefore the wheels need not be removed to permit stacking.

Stacking is especially advantageous when loaded carts are transported to a given location on a truck and the emptied carts are shipped back to the original location, often in conjunction with other goods on the same truck. Stacking allows the space occupied by the empty carts to be minimized, reducing shipping costs. The reduction in space and associated reduction in shipping costs is similarly advantageous in other applications of the structure, for example as the base of a material storage bin, such as a parts bin, or the base of a shelf rack.

Figure 16:
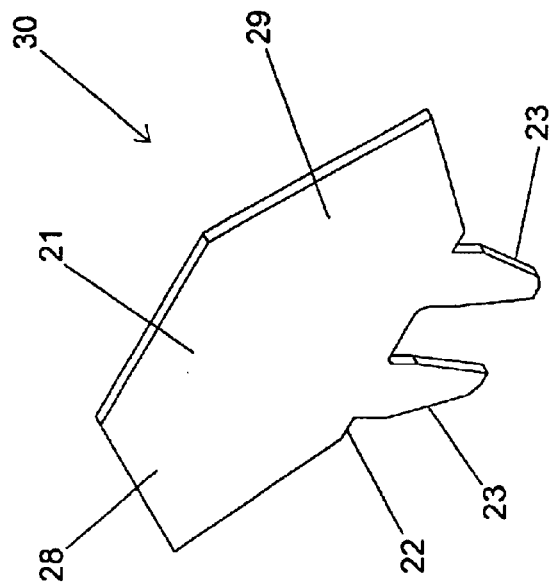
FIG. 16 shows a perspective view of a flat blank according to an alternate embodiment of the present invention.
Figure 15:
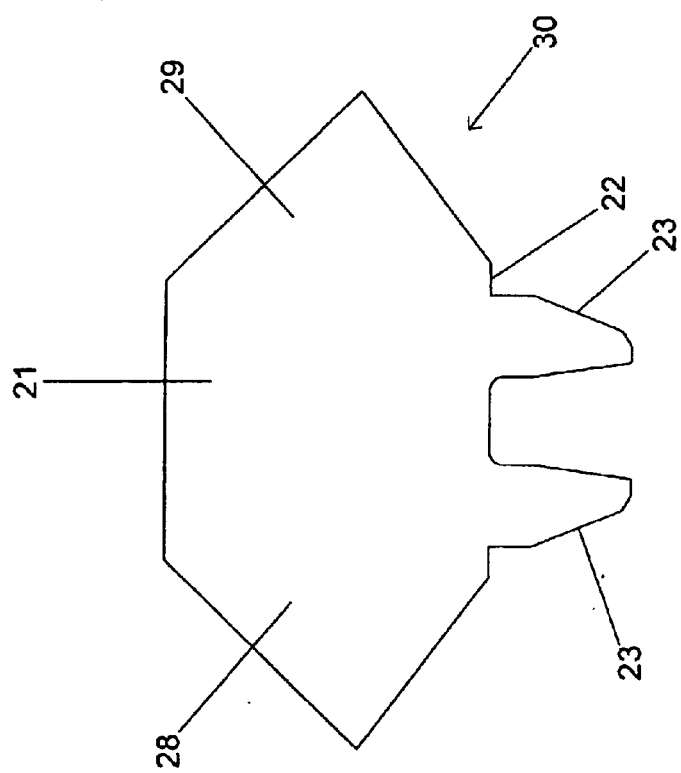

Referring to FIGS. 11–14, an alternate embodiment of a unitized corner, brace according to the present invention is shown. This alternate embodiment is similar to the previously described embodiment in most respects except that the opposed bracket portions 28, 29 have a substantially triangular shape. The central portion 21 has an edge 22 with spaced apart tabs 23 and a right angle 24 located midway between the tabs. The unitized corner brace is generally symmetrical about the right angle 24. Each tab 23 has a stepped portion 25 proximal to the edge 22 that has two bends 26, 27. This alternate embodiment is otherwise similar to the embodiment previously described. A flat blank 30 for manufacturing this alternate embodiment is shown in FIGS. 15–16. The manufacturing method previously described may be used to manufacture this alternate embodiment of the unitized corner brace from the flat blank 30.

Additional aspects of the invention which are inherent to the structure will be evident to a person of ordinary skill in the art.

Variations in aspects or features of the invention described herein are evident to one skilled in the art and are within the scope of the claims.

The foregoing description and the drawings are provided by way of example and should not be used to limit the scope of the following claims.

What is claimed is:

1. A unitized corner brace comprising:
   a) a central portion having an edge and a right angle;
   b) two spaced apart tabs proximal one another extending from the edge, each tab having a stepped portion proximal to the edge and stepped towards each other, the right angle being between the spaced apart tabs such that the tabs are perpendicular to each other;
   c) a space bounded on all sides by the stepped portions of the tabs and the edge of the central portion; and,
   d) opposed bracket portions extending from the central portion.

2. The unitized corner brace of claim 1, wherein the unitized corner brace is made from a single piece of material.

3. The unitized corner brace of claim 1, wherein the stepped portion is angled between 45° and 90° with respect to the central portion.

4. The unitized corner brace of claim 1, wherein the bracket portions are substantially quadrilateral.

5. The unitized corner brace of claim 1, wherein the bracket portions are substantially triangular.

6. A stackable structure having four corners, each corner comprising:
   a) a pair of perpendicular structural members;
   b) a post support member perpendicular to the structural members, the post support member having a length and comprising two ends, a right angle along the length of the post support member, and an open portion adjacent at least one of the ends;
   c) a unitized corner brace comprising a central portion having an edge and a right angle; two spaced apart tabs extending from the edge, each tab having a stepped portion proximal to the edges and stepped towards each other, the right angle being between the spaced apart tabs such that the tabs are perpendicular to each other; and, bracket portions extending from the central portion to form opposed brackets; and,
   d) wherein the central portion is adjacent the post support member, the right angle of the central portion and the right angle of the post support member are aligned, the stepped portion abuts an end of the post support member distal from the open portion, the central portion is attached to the post support member, the perpendicular structural members are adjacent the bracket portions and attached thereto and wherein each corner is aligned with the adjacent corners and connected thereto by means of a perpendicular structural member.

7. The stackable structure of claim 6, wherein the open portion extends along the entire length of the post support member.

8. The stackable structure of claim 6, wherein the post support member is a tube, the tube having a hollow interior, and wherein the open portion is the hollow interior.

9. The stackable structure of claim 8, wherein the tube has a square cross-section.

10. The stackable structure of claim 6, wherein each perpendicular structural member is attached to two corners of the stackable structure.

11. The stackable structure of claim 6, wherein the structure is the base of a cart.

12. The stackable structure of claim 6, wherein the open portion of each post support member is adapted to receive a removable post member, the removable post member for supporting a removable shelf therefrom.

13. The stackable structure of claim 6, wherein the structure is the base of a shelf rack.

14. The stackable structure of claim 6, wherein the open portion of each post support member is adapted to receive a removable post member, the removable post member for supporting a removable shelf element therefrom.

15. A method of manufacturing a unitized corner brace comprising:
   a) cutting a single piece of material into a flat blank having a central portion having an edge comprising two spaced apart tabs proximal one another extending from the edge, the central portion having opposed bracket portions extending therefrom;
   b) forming a right angle in the central portion between the two spaced apart tabs; and,
   c) forming a stepped portion in each tab proximal to the edge and stepped towards each other to thereby form a space bounded on all sides by the stepped portions of the tabs and the edge of the central portion.

16. The method of claim 15, wherein the right angle is formed by bending the central portion.

17. The method of claim 15, wherein the stepped portion is formed by bending the tab portion.

18. The method of claim 15, wherein the tab has a bend having an angle of between 45° and 90° with respect to the central portion.

19. The method of claim 15, wherein the right angle and stepped portion are formed using a progressive die.

20. The stackable structure of claim 6, wherein the structure is the base of a storage bin.

* * * * *

UNITED STATES PATENT AND TRADEMARK OFFICE
CERTIFICATE OF CORRECTION

PATENT NO. : 6,854,239 B2
DATED : December 6, 2002
INVENTOR(S) : White et al.

It is certified that error appears in the above-identified patent and that said Letters Patent is hereby corrected as shown below:

Title page,
Item [75], Inventors, delete "Plateeuw" and replace with -- Platteeuw --.

Signed and Sealed this

Seventeenth Day of May, 2005

JON W. DUDAS
*Director of the United States Patent and Trademark Office*